United States Patent
Lee

(10) Patent No.: US 9,377,604 B2
(45) Date of Patent: Jun. 28, 2016

(54) ZOOM LENS AND ELECTRONIC APPARATUS HAVING THE SAME

(71) Applicant: SAMSUNG ELECTRONICS CO., LTD., Suwon-si, Gyeonggi-do (KR)

(72) Inventor: Ki-woo Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/283,753

(22) Filed: May 21, 2014

(65) Prior Publication Data

US 2015/0160433 A1 Jun. 11, 2015

(30) Foreign Application Priority Data

Dec. 11, 2013 (KR) ........................ 10-2013-0154105

(51) Int. Cl.
*G02B 15/14* (2006.01)
*G02B 13/00* (2006.01)

(52) U.S. Cl.
CPC .................................... *G02B 13/009* (2013.01)

(58) Field of Classification Search
CPC ...................................................... G02B 13/009
USPC ................................ 359/676, 686, 715, 695, 684
See application file for complete search history.

(56) References Cited

U.S. PATENT DOCUMENTS

| | | |
|---|---|---|
| 7,593,165 B2 | 9/2009 | Souma |
| 7,692,870 B2 | 4/2010 | Ohtake |
| 7,830,612 B2 | 11/2010 | Hagiwara |
| 7,982,967 B2 | 7/2011 | Fujisaki |
| 8,184,377 B2 | 5/2012 | Kimura |
| 8,189,270 B2 | 5/2012 | Ori et al. |
| 8,339,714 B2 | 12/2012 | Tochigi et al. |
| 8,351,130 B2 | 1/2013 | Fujisaki |
| 8,379,114 B2 | 2/2013 | Touchi et al. |
| 8,451,549 B2 | 5/2013 | Yamanaka et al. |
| 8,503,095 B2 | 8/2013 | Kimura |
| 8,520,318 B2 | 8/2013 | Hosoi et al. |
| 8,564,711 B2 | 10/2013 | Morooka et al. |
| 8,611,016 B2 | 12/2013 | Imaoka et al. |
| 2011/0261232 A1 | 10/2011 | Touchi et al. |
| 2012/0026600 A1 | 2/2012 | Matsumura |

FOREIGN PATENT DOCUMENTS

| | | |
|---|---|---|
| JP | 2008-304708 A | 12/2008 |
| JP | 2009-047785 A | 3/2009 |
| JP | 2009-282398 A | 12/2009 |

(Continued)

*Primary Examiner* — Alicia M Harrington
(74) *Attorney, Agent, or Firm* — Drinker Biddle & Reath LLP

(57) ABSTRACT

A zoom lens includes: a first lens group having a positive refractive power; a second lens group having a negative refractive power; a third lens group having a positive refractive power; a fourth lens group having a negative refractive power; and a fifth lens group having a positive refractive power, wherein the first to fifth lens groups are sequentially arranged in a direction from an object side, during zooming from a wide-angle position to a telephoto position, the first to fifth lens groups are moved, the third lens group includes a first positive lens, a second negative lens, and a third positive lens, and the second negative lens of the third lens group includes a concave object-side surface. The zoom lens may be part of an electronic apparatus, such as a photographing apparatus.

15 Claims, 10 Drawing Sheets

(56) References Cited

FOREIGN PATENT DOCUMENTS

| | | |
|---|---|---|
| JP | 2011-033868 A | 2/2011 |
| JP | 2011-075975 A | 4/2011 |
| JP | 2011-081113 A | 4/2011 |
| JP | 2011-123337 A | 6/2011 |
| JP | 2011-154390 A | 8/2011 |
| JP | 2011-186417 A | 9/2011 |
| JP | 2011-197472 A | 10/2011 |
| JP | 2011-221554 A | 11/2011 |
| JP | 2011-232542 A | 11/2011 |
| JP | 2011-232543 A | 11/2011 |
| JP | 2011-237588 A | 11/2011 |
| JP | 2011-247962 A | 12/2011 |
| JP | 2012-008601 A | 1/2012 |
| JP | 2012-032842 A | 2/2012 |
| JP | 2012-048199 A | 3/2012 |
| JP | 2012-083472 A | 4/2012 |
| JP | 2012-083602 A | 4/2012 |
| JP | 2012-159578 A | 8/2012 |

ZOOM LENS AND ELECTRONIC APPARATUS HAVING THE SAME

CROSS-REFERENCE TO RELATED APPLICATIONS

This application claims the priority benefit of Korean Patent Application No. 10-2013-0154105, filed on Dec. 11, 2013, in the Korean Intellectual Property Office, the disclosure of which is incorporated herein in its entirety by reference.

BACKGROUND

1. Field

One or more embodiments relate to a zoom lens having a small size and a high zoom ratio and an electronic apparatus including the zoom lens.

2. Description of the Related Art

Users of electronic devices that have photographing apparatuses (digital cameras, exchangeable lens systems, or video cameras) with solid state imaging devices demand high resolution and high magnification. Since photographing apparatuses with solid state imaging devices are suitable for miniaturization, they are used in small-sized information terminals such as mobile phones. Also, consumers' professionalism with respect to photographing apparatuses is increasing, and development of small-sized and wide-angle zoom lenses is increasing due to this market demand. However, it is difficult to achieve a small size together with high performance.

SUMMARY

One or more embodiments include a zoom lens having a small size and a high zoom ratio.

One or more embodiments include an electronic apparatus having a zoom lens having a small size and a high zoom ratio.

Additional aspects will be set forth in part in the description which follows and, in part, will be apparent from the description, or may be learned by practice of the disclosed embodiments.

According to one or more embodiments, a zoom lens includes: a first lens group having a positive refractive power; a second lens group having a negative refractive power; a third lens group having a positive refractive power; a fourth lens group having a negative refractive power; and a fifth lens group having a positive refractive power; wherein the first to fifth lens groups are sequentially arranged in a direction from an object side, during zooming from a wide-angle position to a telephoto position, the first to fifth lens groups are moved, the third lens group includes a first positive lens, a second negative lens, and a third positive lens, the second negative lens of the third lens group includes a concave object-side surface, the fourth lens group includes a fourth negative lens having a convex object-side surface, and the fifth lens group includes a fifth positive lens having a convex object-side surface.

The second lens group may include one or more lenses, and a lens of the second lens group closest to an image side may satisfy the following expression:

$$2.0 < nG6 < 2.5$$

where nG6 denotes a refractive index of the lens of the second lens group closest to the image side.

The lens of the second lens group closest to the image side may be an aspheric lens.

The zoom lens may satisfy the following expression:

$$16 \leq ft/fw \leq 20$$

where ft denotes a focal length of the zoom lens at the telephoto position, and fw denotes a focal length of the zoom lens at the wide-angle position.

The zoom lens may satisfy the following expression:

$$70 < G3vd < 96$$

where G3vd denotes an Abbe number of a positive lens of the third lens group closest to the image side.

The second negative lens of the third lens group may be a double concave lens.

The second lens group may include a sixth negative lens, a seventh negative lens, and an eighth positive lens.

The zoom lens may satisfy the following expression:

$$1.0 \leq G6R1/G6f \leq 2.0$$

where G6R1 denotes a radius of curvature of an object-side surface of the eighth positive lens, and G6f denotes a focal length of the eighth positive lens.

The first positive lens may be an aspheric double convex lens.

The zoom lens may satisfy the following expression:

$$1 \leq L3G/L2G \leq 2.1$$

where L3G denotes a distance that the third lens group moves during zooming, and L2G denotes a distance that the second lens group moves during zooming.

The fourth negative lens may satisfy the following expression:

$$50 \leq 4Gvd \leq 82$$

where 4Gvd denotes an Abbe number of the fourth negative lens.

The fifth positive lens may have a refractive index equal to or lower than about 1.55.

The fifth positive lens may be an aspheric plastic lens.

During zooming, a distance between the first and second lens groups may be increased, a distance between the second and third lens groups may be decreased, a distance between the third and fourth lens groups may be increased, and a distance between the fourth and fifth lens groups may be decreased.

The fifth positive lens may be used for focusing.

The fourth and fifth lenses may have meniscus shapes.

According to one or more embodiments, a photographing apparatus include: a zoom lens; and an imaging device configured to receive images formed by the zoom lens, wherein the zoom lens include a first lens group having a positive refractive power, a second lens group having a negative refractive power, a third lens group having a positive refractive power, a fourth lens group having a negative refractive power, and a fifth lens group having a positive refractive power, wherein the first to fifth lens groups are sequentially arranged in a direction from an object side, during zooming from a wide-angle position to a telephoto position, the first to fifth lens groups are moved, the third lens group includes a first positive lens, a second negative lens, and a third positive lens, the second negative lens of the third lens group includes a concave object-side surface, the fourth lens group includes a fourth negative lens having a convex object-side surface, and the fifth lens group includes a fifth positive lens having a convex object-side surface.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
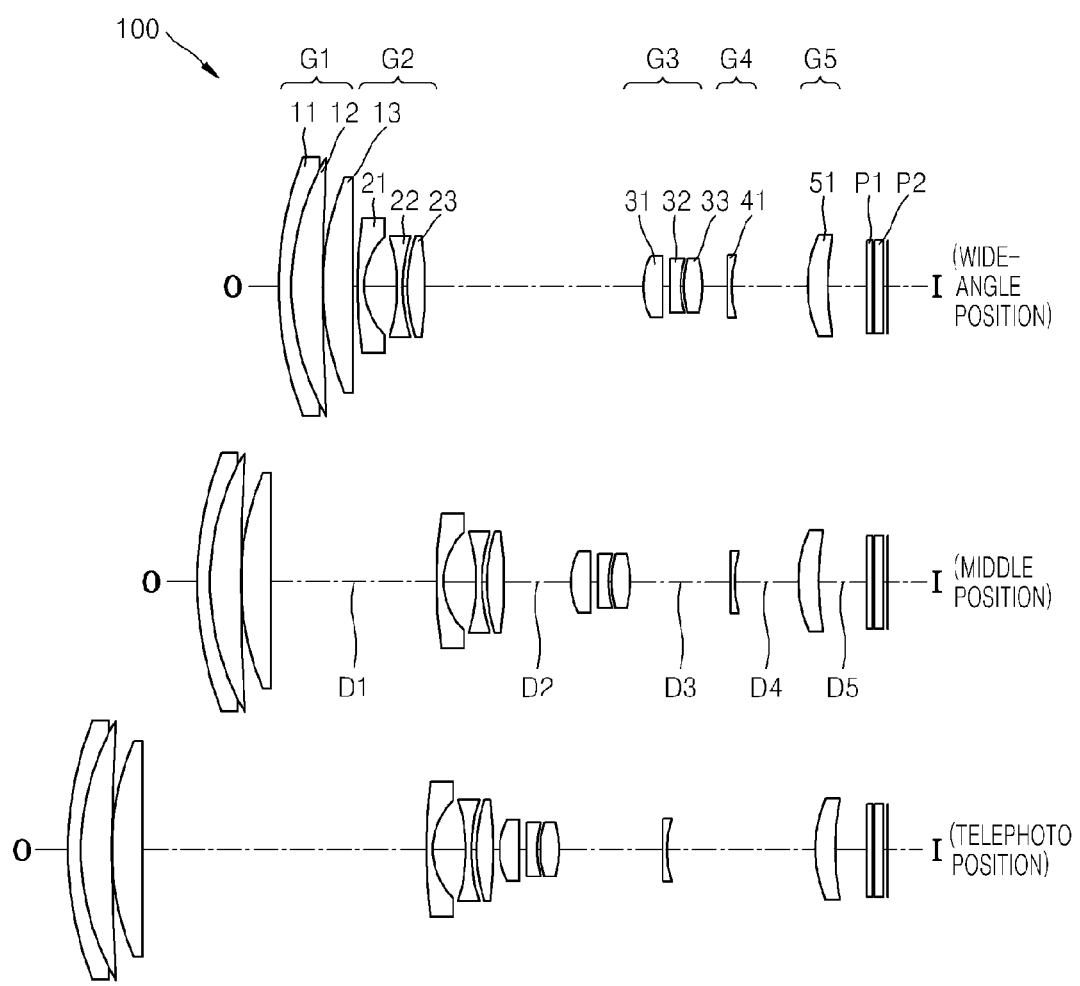
FIG. 1 is a view illustrating a wide-angle position, a middle position, and a telephoto position of a zoom lens according to a first embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, a zoom lens and an electronic apparatus including the zoom lens will be described in detail with reference to the accompanying drawings according to exemplary embodiments.

FIG. 1 is a view illustrating a zoom lens 100 according to an embodiment.

The zoom lens 100 may include a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The first to fifth lens groups G1 to G5 may be sequentially arranged from an object side O to an image side I.

During zooming from a wide-angle position to a telephoto position, all the first to fifth lens groups G1 to G5 may be moved. During zooming, the distance between the first lens group G1 and the second lens group G2 may be increased, the distance between the second lens group G2 and the third lens group G3 may be decreased, the distance between the third lens group G3 and the fourth lens group G4 may be increased, and the distance between the fourth lens group G4 and the fifth lens group G5 may be decreased.

For example, the first lens group G1 may include a first lens 11, a second lens 12, and a third lens 13. The first lens 11 may have a negative refractive power, the second lens 12 may have a positive refractive power, and the third lens 13 may have a positive refractive power.

For example, the second lens group G2 may include a fourth lens 21, a fifth lens 22, and a sixth lens 23. The fourth lens 21 may have a negative refractive power, the fifth lens 22 may have a negative refractive power, and the sixth lens 23 may have a positive refractive power. The fourth lens 21 may be a meniscus lens being convex toward the object side O. The fourth lens 21 may be an aspheric lens. The fifth lens 22 may be a bi-concave lens. The sixth lens 23 may have a convex object-side surface. For example, the sixth lens 23 may be a meniscus lens being convex toward the object side O or a bi-convex lens. Astigmatic aberration may be easily corrected by the second lens group G2. The fourth lens 21 and the sixth lens 23 may be high refractive lenses, and thus the second lens group G2 may have a refractive power greater than those of other lens groups. In this case, during zooming from the wide-angle position to the telephoto position, a high zoom magnification may be obtained although the second lens group G2 is little moved.

The third lens group G3 may include a seventh lens 31, an eighth lens 32, and a ninth lens 33. The seventh lens 31 may have a positive refractive power, the eighth lens 32 may have a negative refractive power, and the ninth lens 33 may have a positive refractive power. Spherical aberration and chromatic aberration of magnification may be effectively corrected by the third lens group G3. The seventh lens 31 may be an aspheric convex lens. The seventh lens 31 may reduce spherical aberration at a high zoom magnification. The eighth lens 32 may have a concave object-side surface. For example, the eighth lens 32 may be a bi-concave lens or a meniscus lens being concave toward the object side O. The eighth lens 32 and the ninth lens 33 may reduce chromatic aberration of magnification during zooming. If the seventh lens 31 has a convex image-side surface and the eighth lens 32 has a concave object-side surface, the distance between the seventh lens 31 and the eighth lens 32 may be reduced.

If the eighth lens 32 of the third lens group G3 has a concave object-side surface, spherical aberration and chromatic aberration may be reduced while minimizing an air gap between the seventh lens 31 and the eighth lens 32 and reducing the thickness of the third lens group G3.

An aperture stop may be disposed at an object side of the third lens group G3. In addition, during zooming, the second lens group G2 and the third lens group G3 may be moved almost the same distance so as to reduce the total length of the zoom lens 100 at the telephoto position.

The fourth lens group G4 may include a tenth lens 41. The tenth lens 41 may have a negative refractive power. The tenth lens 41 may be an aspheric lens and may be formed of a low-dispersion material. For example, the tenth lens 41 may have an Abbe number satisfying the expression: $50 \leq 4Gvd \leq 82$ where 4Gvd denotes the Abbe number of a negative lens of the fourth lens group G4 such as the tenth lens 41. The fourth lens group G4 may be constituted by one lens. For example, the tenth lens 41 may have a convex object-side surface. The tenth lens 41 may have a meniscus shape convex toward the object side O.

The fifth lens group G5 may include an eleventh lens 51. The eleventh lens 51 may have a positive refractive power. The eleventh lens 51 may have a positive refractive power equal to or lower than 1.55. For example, the eleventh lens 51 may have an aspheric plastic lens. The eleventh lens 51 may prevent the incident angles of light rays from increasing and may reduce curvature of field at peripheral regions according to the distance from an object. The eleventh lens 51 may have a meniscus shape convex toward the object side O. Since the tenth lens 41 and the eleventh lens 51 are meniscus lenses convex toward the object side O, astigmatic aberration and distortion at the telephoto position may be easily corrected. The fifth lens group G5 may be used for focusing.

The zoom lens 100 may satisfy Expression 1:

$$2.0 < nG6 < 2.5 \qquad \text{<Expression 1>}$$

where nG6 denotes the refractive index of a lens of the second lens group G2 closest to the image side I. For example, nG6 denotes the refractive index of the sixth lens 23. The refractive index may be a value for a wavelength of d-line (587.56 nm).

If the zoom lens 100 satisfies Expression 1, peripheral transverse aberration and astigmatic aberration may be easily corrected. Furthermore, the movement of the second lens group G2 and the sum of lens thicknesses of the second lens group G2 necessary for zooming may be reduced, and thus the total size of the zoom lens 100 may be reduced. In addition, if the sixth lens 23 is an aspheric lens, the performance of the zoom lens 100 may be easily corrected, and the total size of the zoom lens 100 may be easily reduced.

The zoom lens 100 may satisfy Expression 2:

$$16 \leq ft/fw \leq 20 \qquad \text{<Expression 2>}$$

where ft denotes the focal length of the zoom lens 100 at the telephoto position, and fw denotes the focal length of the zoom lens 100 at the wide-angle position. As expressed by Expression 2 relating to zoom magnification, the zoom lens 100 of the current embodiment may have a high zoom magnification.

The zoom lens 100 may satisfy Expression 3:

$$70 < G3vd < 96 \qquad \text{<Expression 3>}$$

where G3vd denotes the Abbe number of a positive lens of the third lens group G3 closest to the image side I. For example, G3vd denotes the Abbe number of the ninth lens 33 of the third lens group G3. If the ninth lens 33 satisfies Expression 3, astigmatic aberration may be easily corrected at a high zoom magnification.

The zoom lens 100 may satisfy Expression 4:

$$1.0 \leq G6R1/G6f \leq 2.0 \qquad \text{<Expression 4>}$$

where G6R1 denotes the radius of curvature of an object-side surface of a lens (for example, the sixth lens 23) of the second lens group G2 closest to the image side I, and G6f denotes the focal length of the lens (for example, the sixth lens 23).

If the zoom lens 100 satisfies Expression 4, the zoom lens 100 may have a small size while suppressing chromatic aberration of magnification and easily correcting spherical aberration.

The zoom lens 100 may satisfy Expression 5:

$$1 \leq L3G/L2G \leq 2.1 \qquad \text{<Expression 5>}$$

where L3G denotes a distance that the third lens group G3 moves during zooming, and L2G denotes a distance that the second lens group G2 moves during zooming.

If the zoom lens 100 satisfies Expression 5, the second lens group G2 and the third lens group G3 may be moved almost the same distance during zooming, and thus the total length of the zoom lens 100 at the telephoto position may be small. That is, the zoom lens 100 may have a small size.

In the embodiments, aspheric or aspheric surfaces are defined as follows.

In the embodiments, aspheric surfaces of the zoom lens may be expressed by Expression 6 below, where an x-axis denotes an optical axis, a y-axis denotes a direction perpendicular to the optical axis, and the propagation direction of light rays is denoted as being positive. Furthermore, in Expression 6, x denotes a distance measured from the vertex of a lens in the direction of the optical axis of the lens, y denotes a distance measured from the optical axis in a direction perpendicular to the optical axis, K denotes a conic constant, A, B, C, D, E, and F denote aspheric coefficients, and c denotes the reciprocal (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} \qquad \text{<Expression 6>}$$

The embodiments provide a zoom lens having a small size and a high zoom ration having the following various design factors.

Hereinafter, design data for the zoom lens will be explained according to various embodiments. In the following explanation, EFL denotes a total focal length in millimeters (mm), Fno denotes an F number, and ANG denotes an angle of view in degrees. In addition, R denotes a radius of curvature, Dn denotes the distance between lenses or the thickness of a lens, nd denotes a refractive index, vd denotes an Abbe number, obj denotes an object-side surface, Img denotes an image surface, sto denotes an aperture stop, and * denotes an aspheric surface. As shown in each of the drawings of the embodiments, one or more filters P1 and P2 may be disposed at a position closest to an image side I.

The filters P1 and P2 may include at least one of low-pass filters and infrared (IR)-cut filters. However, the zoom lens of the embodiments may not include any filter. In each table of the embodiments, surfaces of lenses are sequentially numbered from an object side O to an image side I, and lens-surface numbers are omitted in the drawings.

<First Embodiment>

Figure 3:
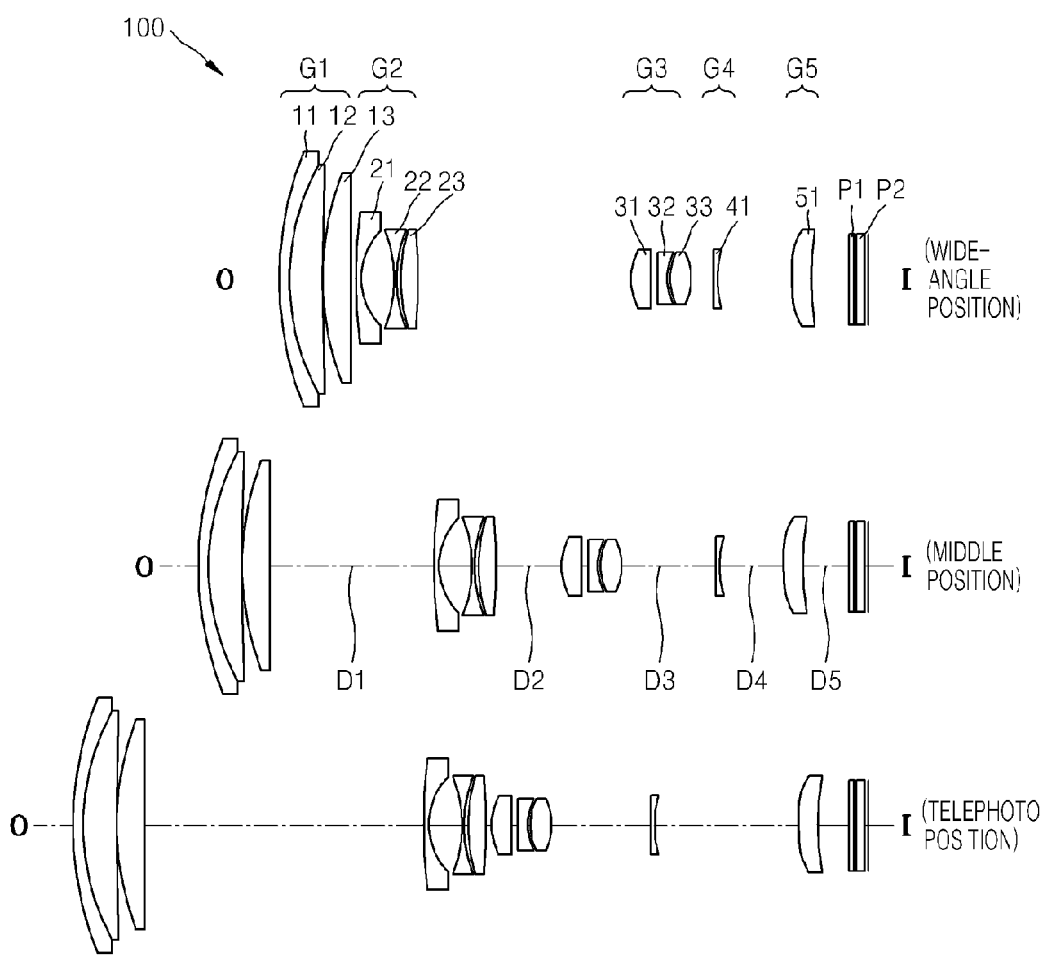
FIG. 3 is a view illustrating a wide-angle position, a middle position, and a telephoto position of a zoom lens according to a second embodiment.
Figure 5:
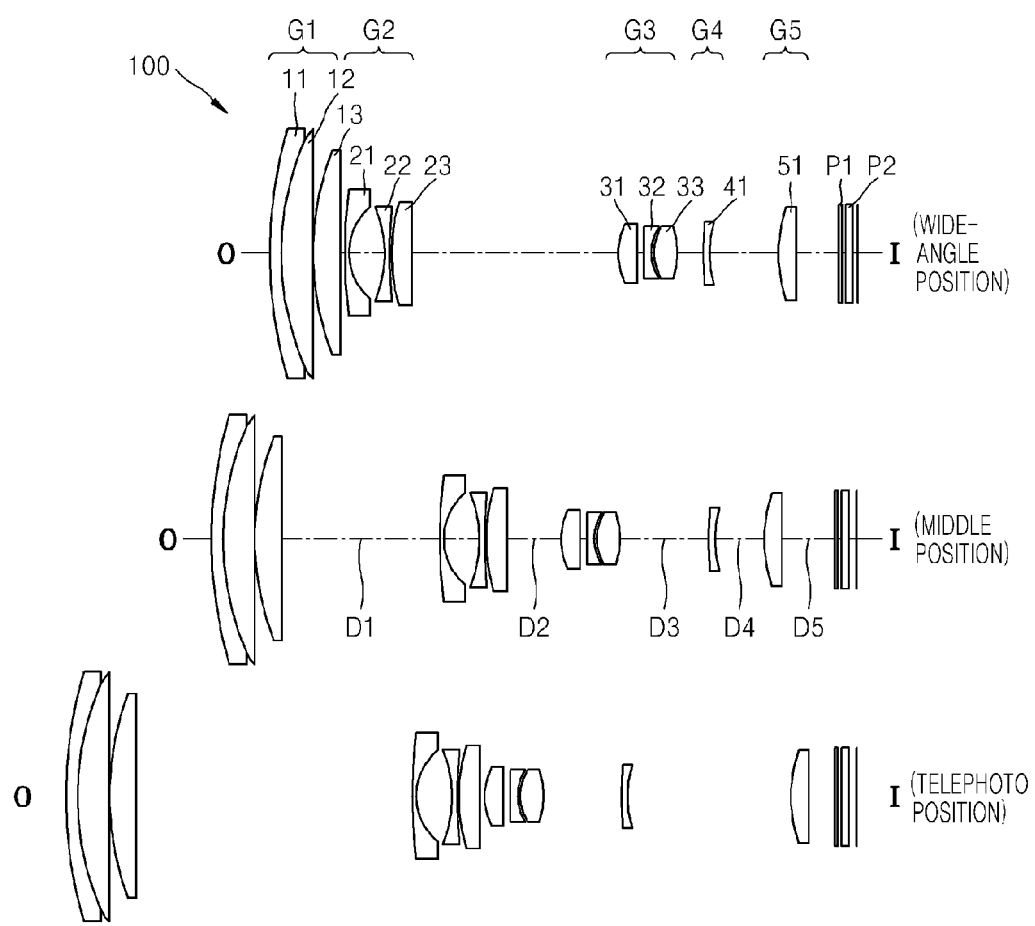
FIG. 5 is a view illustrating a wide-angle position, a middle position, and a telephoto position of a zoom lens according to a third embodiment.

FIG. 1 is a view illustrating the zoom lens 100 according to the first embodiment, and Table 1 shows design data for the zoom lens 100 in an embodiment. FIGS. 3 and 5 show lenses, lens groups, and other structures that will be referred to using the same reference numbers, grouping designations, and other labels used in conjunction with FIG. 1. The lens data for each embodiment will vary, however, and example sets of lens data will be described for each figure. The distances D1, D2, D3, D4, and D5 noted in the following tables correspond to similarly-labeled dimensions in the figures.

TABLE 1

| Lens surfaces | R | Dn | nd | vd |
|---|---|---|---|---|
| obj | infinity | infinity | | |
| 1 | 26.895 | 0.76 | 2.001 | 29.13 |
| 2 | 18.523 | 2.42 | 1.497 | 81.61 |
| 3 | 137.09 | 0.1 | | |
| 4 | 22.907 | 1.95 | 1.593 | 68.62 |
| 5 | 216.73 | D1 | | |
| 6* | 113.887 | 0.3 | 1.85066 | 40.45 |
| 7* | 5.485 | 2.54 | | |
| 8 | −10.557 | 0.4 | 1.83481 | 42.72 |
| 9 | 18.978 | 0.25 | | |
| 10* | 15.095 | 1.17 | 2.14781 | 17.34 |
| 11* | −151.918 | D2 | | |
| sto* | 4.974 | 1.5 | 1.8047 | 40.95 |
| 13* | −30.002 | 0.57 | | |
| 14 | −25.015 | 0.58 | 1.90366 | 31.31 |
| 15 | 3.832 | 0.12 | | |
| 16 | 4.238 | 1.63 | 1.497 | 81.61 |
| 17 | −6.69 | D3 | | |
| 18* | 81.763 | 0.4 | 1.61881 | 63.85 |
| 19* | 9.858 | D4 | | |
| 20* | 8.769 | 1.45 | 1.5324 | 56.06 |
| 21* | 32.853 | D5 | | |
| 22 | infinity | 0.3 | 1.5168 | 64.2 |
| 23 | infinity | 0.3 | | |
| 24 | infinity | 0.5 | 1.5168 | 64.2 |
| 25 | infinity | 0.4 | | |

Table 2 shows aspheric coefficient data of the zoom lens 100 of the first embodiment.

TABLE 2

| Lens surfaces | K | A | B | C | D |
|---|---|---|---|---|---|
| 6 | 0.000000 | 9.711457e-004 | -7.923881e-005 | 2.796484e-006 | -3.809095e-008 |
| 7 | 0.000000 | 1.059144e-003 | -2.875487e-005 | -7.311896e-007 | 3.352195e-008 |
| 10 | 0.000000 | -4.086927e-004 | 2.547589e-005 | -4.057865e-006 | 0.000000e+000 |
| 11 | 0.000000 | -3.673741e-004 | 1.282748e-005 | -2.928590e-006 | 0.000000e+000 |
| 12 | 0.348000 | -3.940555e-004 | -2.366385e-006 | 0.000000e+000 | 0.000000e+000 |
| 13 | 0.000000 | 1.065006e-003 | -1.928745e-006 | 0.000000e+000 | 0.000000e+000 |
| 18 | -1.000000 | 7.066639e-004 | -4.391808e-006 | -3.302801e-006 | 0.000000e+000 |
| 19 | -0.956000 | 9.094690e-004 | -9.301447e-006 | -1.858964e-006 | 0.000000e+000 |
| 20 | 0.000000 | 1.437126e-004 | -6.642508e-006 | 0.000000e+000 | 0.000000e+000 |
| 21 | 0.000000 | 2.346330e-004 | -1.330906e-005 | 0.000000e+000 | 0.000000e+000 |

Table 3 shows variable distance data during zooming according to an embodiment.

TABLE 3

| Variable distances | Wide-angle position | Middle position | Telephoto position |
|---|---|---|---|
| D1 | 0.504 | 12.3 | 20.9 |
| D2 | 15.841 | 4.858 | 0.47 |
| D3 | 1.7 | 7.117 | 7.42 |
| D4 | 5.501 | 4.588 | 10.592 |
| D5 | 2.8 | 3.535 | 2.394 |

Table 4 shows design data for the zoom lens 100 of the first embodiment.

TABLE 4

|  | Wide-angle position | Middle position | Telephoto position |
|---|---|---|---|
| EFL | 4.24 | 18.37 | 69.88 |
| Fno | 3.5 | 5.1 | 6.7 |
| ANG | 84 | 19.7 | 5.2 |

Figure 2A:
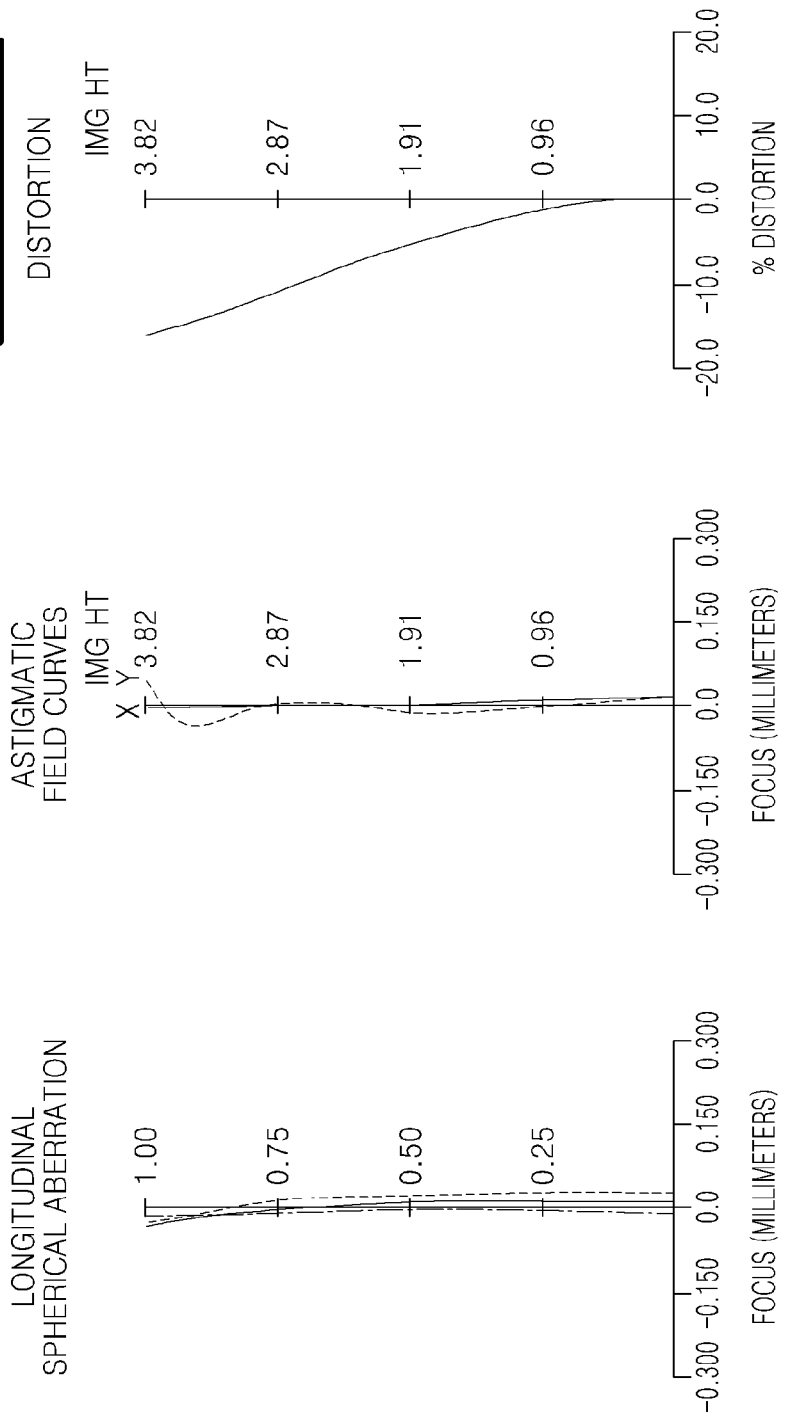
FIGS. 2A and 2B are aberration diagrams of a zoom lens of the first embodiment.
Figure 2B:
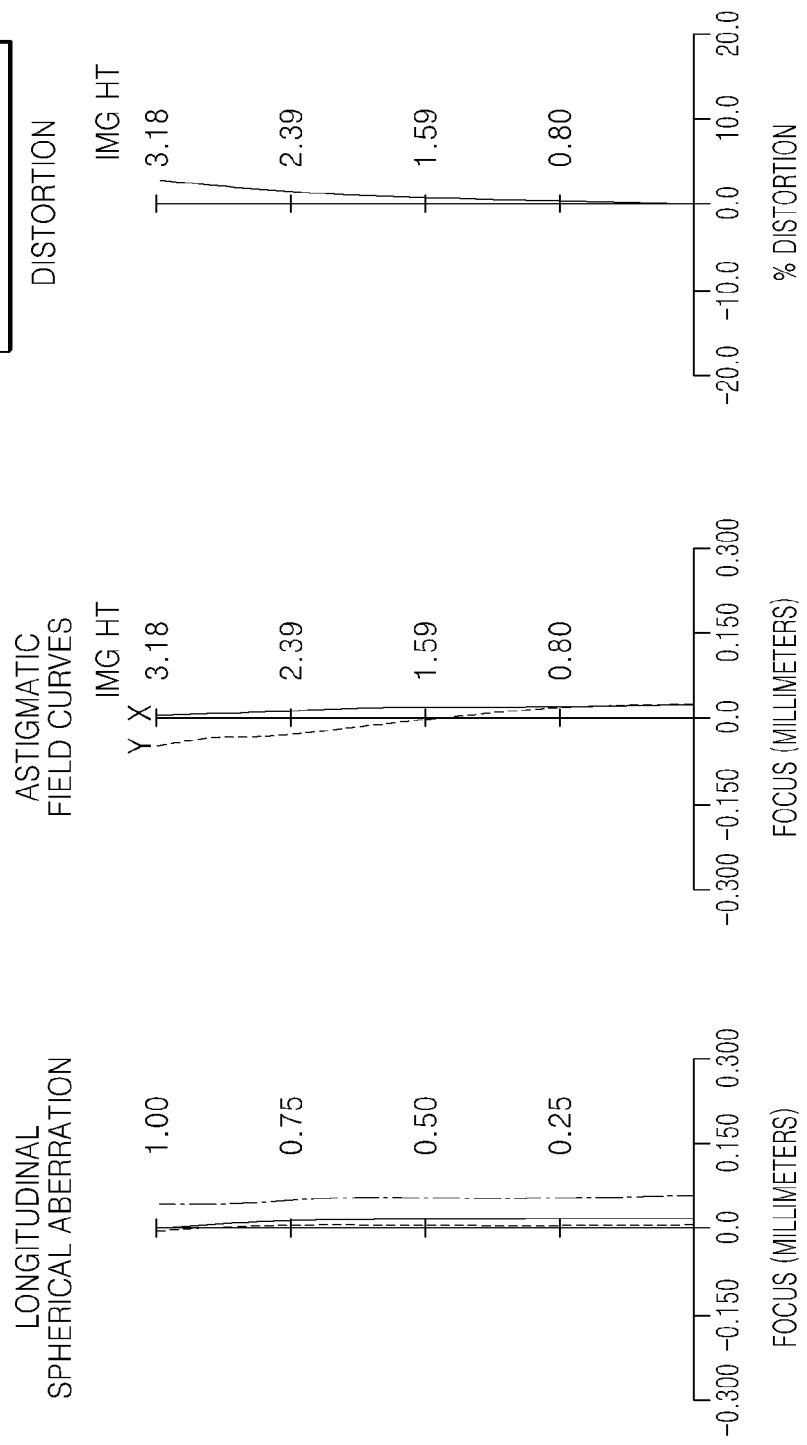

FIGS. 2A and 2B show longitudinal spherical aberration, astigmatic field curves, and distortion of the zoom lens 100 at the wide-angle position and the telephoto position according to the first embodiment. The astigmatic field curves include a tangential field curvature T and a sagittal field curvature S.

<Second Embodiment>

FIG. 3 is a view illustrating zoom lens 100 according to a second embodiment, and Table 5 shows design data for the zoom lens 100 according to an embodiment.

TABLE 5

| Lens surfaces | R | Dn | nd | vd |
|---|---|---|---|---|
| Obj | infinity | infinity |  |  |
| 1 | 35.176 | 0.84 | 2.001 | 29.13 |
| 2 | 23.246 | 2.64 | 1.497 | 81.61 |
| 3 | 800.194 | 0.1 |  |  |
| 4 | 25.457 | 2.10 | 1.59282 | 68.62 |
| 5 | 193.37 | D1 |  |  |
| 6* | 80.119 | 0.33 | 1.85066 | 40.45 |
| 7* | 6.484 | 2.87 |  |  |
| 8 | -9.323 | 0.44 | 1.83481 | 42.72 |
| 9 | 22.322 | 0.27 |  |  |
| 10* | 17.701 | 1.29 | 2.14781 | 17.34 |
| 11* | -84.724 | D2 |  |  |
| sto* | 5.356 | 1.7 | 1.8047 | 40.95 |
| 13* | -26.447 | 0.55 |  |  |
| 14 | -24.389 | 0.7 | 1.90366 | 31.31 |
| 15 | 4.112 | 0.13 |  |  |
| 16 | 4.554 | 1.76 | 1.497 | 81.61 |
| 17 | -7.947 | D3 |  |  |
| 18* | 71.765 | 0.4 | 1.61881 | 63.85 |
| 19* | 10.188 | D4 |  |  |
| 20* | 7.718 | 1.64 | 1.5324 | 56.06 |
| 21* | 21.471 | D5 |  |  |
| 22 | infinity | 0.3 | 1.5168 | 64.2 |
| 23 | infinity | 0.5 |  |  |
| 24 | infinity | 0.5 | 1.5168 | 64.2 |
| 25 | infinity | 0.4 |  |  |

Table 6 shows aspheric coefficients according to an embodiment.

TABLE 6

| Lens surfaces | K | A | B | C | D |
|---|---|---|---|---|---|
| 6 | 0.000000 | 1.069292e-003 | -6.439894e-005 | 1.560601e-006 | -1.411063e-008 |
| 7 | 0.000000 | 1.067155e-003 | -2.112174e-005 | -1.298413e-006 | 6.353388e-009 |
| 10 | 0.000000 | -3.487927e-004 | 1.393987e-005 | -2.055349e-006 | 0.000000e+000 |
| 11 | 0.000000 | -2.383742e-004 | 3.818440e-005 | -1.307910e-006 | 0.000000e+000 |
| 12 | 0.359354 | -3.588897e-004 | -2.167819e-006 | 0.000000e+000 | 0.000000e+000 |
| 13 | 0.000000 | 7.732125e-004 | 2.337529e-006 | 0.000000e+000 | 0.000000e+000 |
| 18 | -1.000000 | 3.457858e-004 | -3.342788e-005 | 1.327684e-006 | 0.000000e+000 |
| 19 | -0.805350 | 4.362000e-004 | -3.875938e-005 | 2.188348e-006 | 0.000000e+000 |
| 20 | 0.000000 | -2.384953e-004 | 5.043531e-006 | 0.000000e+000 | 0.000000e+000 |
| 21 | 0.000000 | -1.365285e-004 | 5.041007e-006 | 0.000000e+000 | 0.000000e+000 |

Table 7 shows variable distances during zooming according to the second embodiment.

TABLE 7

| Variable distances | Wide-angle position | Middle position | Telephoto position |
|---|---|---|---|
| D1 | 0.47 | 13.783 | 23.475 |
| D2 | 17.737 | 5.426 | 0.5 |
| D3 | 1.7 | 8.452 | 10.025 |
| D4 | 7.365 | 5.121 | 9.937 |
| D5 | 2.6 | 3.593 | 2.794 |

Table 8 shows design data for the zoom lens 100 of the second embodiment.

TABLE 8

| | Wide-angle position | Middle position | Telephoto position |
|---|---|---|---|
| EFL | 4.73 | 20.49 | 77.96 |
| Fno | 3.6 | 5.1 | 6.7 |
| ANG | 84 | 19.7 | 5.2 |

Figure 4A:
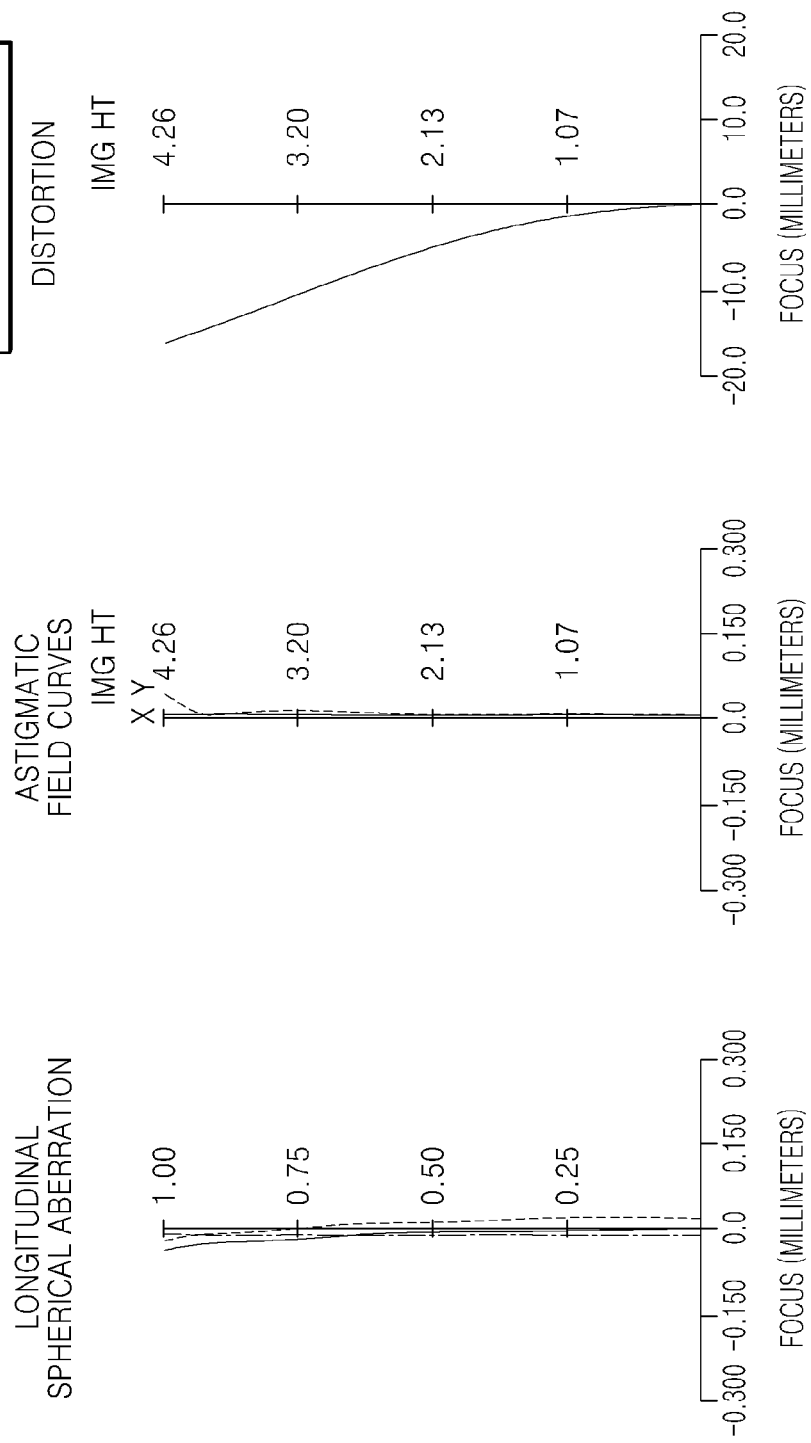
FIGS. 4A and 4B are aberration diagrams of a zoom lens of the second embodiment.
Figure 4B:
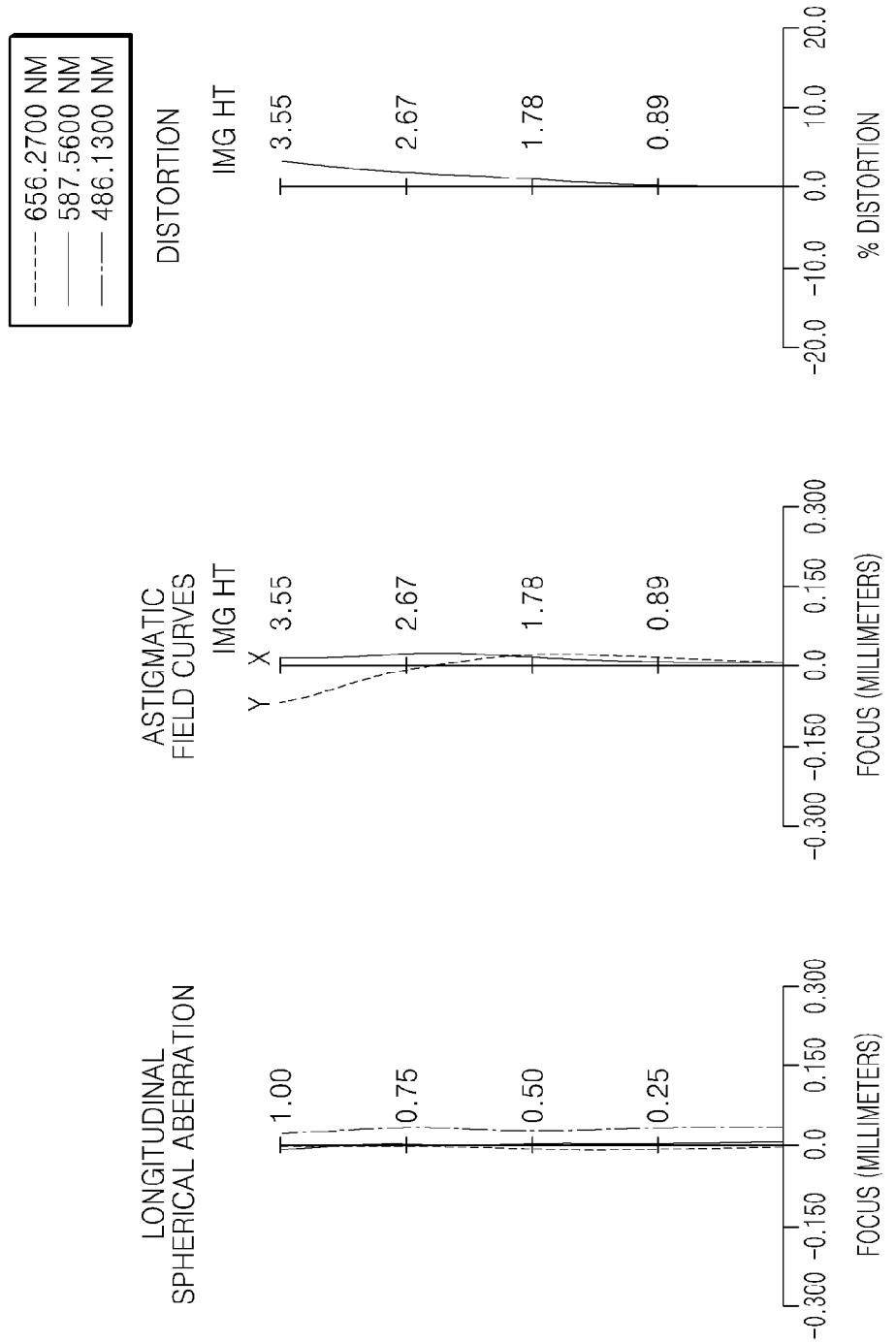

FIGS. 4A and 4B show longitudinal spherical aberration, astigmatic field curves, and distortion of the zoom lens 100 at the wide-angle position and the telephoto position according to the second embodiment.

<Third Embodiment>

FIG. 5 is a view illustrating zoom lens 100 according to a third embodiment, and Table 9 shows design data for the zoom lens 100.

TABLE 9

| Lens surfaces | R | Dn | nd | vd |
|---|---|---|---|---|
| Obj | infinity | A | | |
| 1 | 31.253 | 0.76 | 2.001 | 29.13 |
| 2 | 20.709 | 2.41 | 1.497 | 81.61 |
| 3 | 520.081 | 0.1 | | |
| 4 | 21.689 | 1.89 | 1.59282 | 68.62 |
| 5 | 137.47 | B | | |
| 6* | 34.243 | 0.3 | 1.85066 | 40.45 |
| 7* | 4.818 | 2.61 | | |
| 8 | −10.346 | 0.4 | 1.83481 | 42.72 |
| 9 | 24.779 | 0.1 | | |
| 10 | 12.27 | 1.49 | 2.10421 | 17.03 |
| 11 | 111.38 | C | | |
| sto* | 5.19 | 1.47 | 1.8047 | 40.95 |
| 13* | −73.049 | 0.5 | | |
| 14 | −58.024 | 0.4 | 1.90366 | 31.31 |
| 15 | 4.263 | 0.12 | | |
| 16 | 4.74 | 1.91 | 1.497 | 81.61 |
| 17 | −5.833 | D | | |
| 18 | 59.038 | 0.4 | 1.618 | 63.39 |
| 19 | 7.423 | E | | |
| 20* | 10.639 | 1.43 | 1.5324 | 56.06 |
| 21* | 95.891 | F | | |
| 22 | infinity | 0.3 | 1.5168 | 64.2 |
| 23 | infinity | 0.3 | | |
| 24 | infinity | 0.5 | 1.5168 | 64.2 |
| 25 | infinity | 0.4 | | |

TABLE 9-continued

| Lens surfaces | R | Dn | nd | vd |
|---|---|---|---|---|

Table 10 shows aspheric coefficient data of the zoom lens 100 of the third embodiment.

TABLE 10

| Lens surfaces | K | A | B | C | D |
|---|---|---|---|---|---|
| 6 | 0.000000 | 1.598549e−004 | −1.909432e−005 | 4.428022e−007 | −4.709443e−009 |
| 7 | 0.000000 | 2.925046e−004 | −5.325752e−006 | 7.206454e−007 | −6.686832e−008 |
| 12 | 0.561622 | −3.665921e−004 | 8.426521e−006 | 0.000000e+000 | 0.000000e+000 |
| 13 | 0.000000 | 1.510710e−003 | 2.729638e−005 | 0.000000e+000 | 0.000000e+000 |
| 20 | 0.000000 | 5.093712e−005 | −8.830775e−007 | 0.000000e+000 | 0.000000e+000 |
| 21 | 0.000000 | −4.359491e−006 | −2.775887e−006 | 0.000000e+000 | 0.000000e+000 |

Table 11 shows variable distance data during zooming.

TABLE 11

| Variable distances | Wide-angle position | Middle position | Telephoto position |
|---|---|---|---|
| D1 | 0.47 | 12.167 | 20.8 |
| D2 | 15.55 | 4.101 | 0.47 |
| D3 | 1.94 | 6.671 | 5.875 |
| D4 | 5.181 | 3.741 | 12.17 |
| D5 | 3.079 | 3.983 | 2 |

Table 12 shows design data for the zoom lens 100 of the third embodiment.

TABLE 12

| | Wide-angle position | Middle position | Telephoto position |
|---|---|---|---|
| EFL | 4.24 | 18.37 | 69.9 |
| Fno | 3.5 | 4.9 | 6.7 |
| ANG | 84 | 21.5 | 5.21 |

Figure 6A:
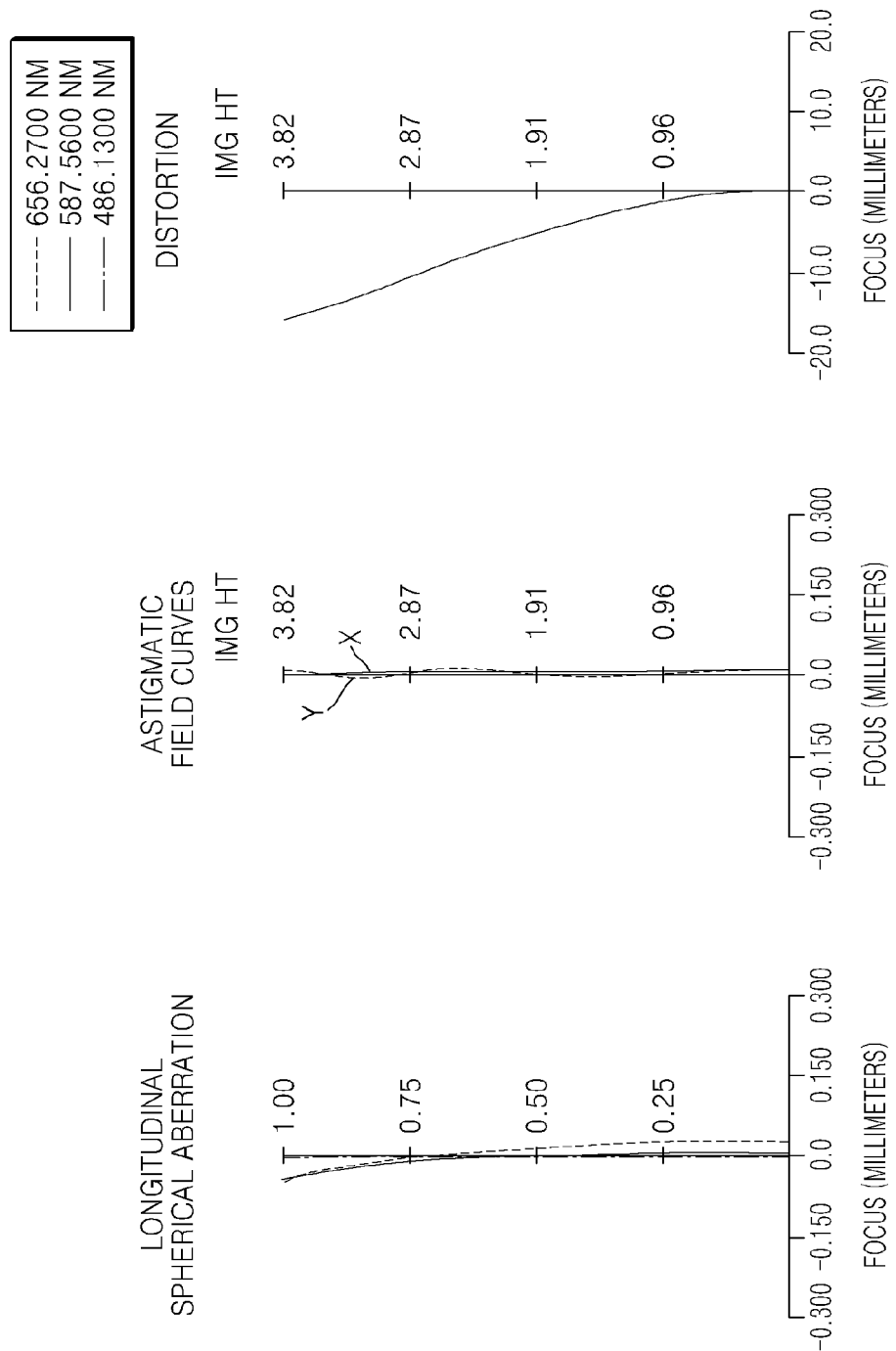
FIGS. 6A and 6B are aberration diagrams of a zoom lens of the third embodiment.
Figure 6B:
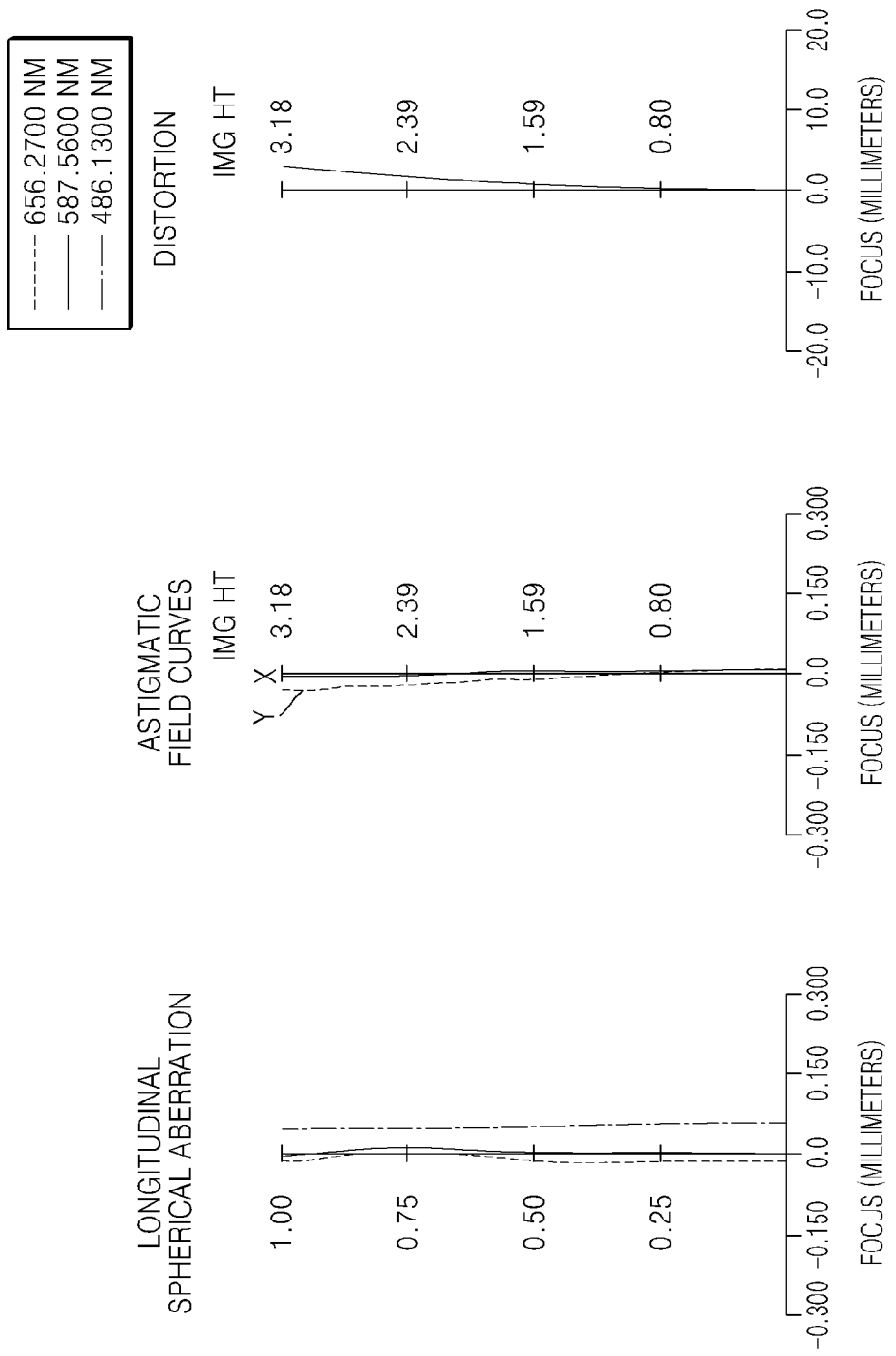

FIGS. 6A and 6B show longitudinal spherical aberration, astigmatic field curves, and distortion of the zoom lens 100 at the wide-angle position and the telephoto position according to the third embodiment.

Table 13 shows that the zoom lens 100 of the first to third embodiments satisfies Expressions 1 to 5, respectively.

TABLE 13

| Expressions | First embodiment | Second embodiment | Third embodiment |
|---|---|---|---|
| Expression (1) | 2.148 | 2.148 | 2.104 |
| Expression (2) | 16.486 | 16.482 | 16.486 |
| Expression (3) | 81.61 | 81.61 | 81.61 |
| Expression (4) | 1.274 | 1.397 | 1.004 |
| Expression (5) | 2.077 | 1.855 | 1.999 |

According to various embodiments, the zoom lens may have a small size and high magnification ability. The zoom lens of the vrious embodiments may be used in apparatuses employing solid-state imaging device, such as digital cameras, video cameras, and portable terminals.

Since there is a limit in reducing the sizes of image sensors or electronic components, the size of a zoom lens may have significant influence on reducing the sizes of cameras. In the case of a camera including a retractable lens barrel, pictures are taken by extending the lens barrel, and after photographing, the lens barrel is retracted into the camera. A photographing apparatus including such a retractable lens barrel may have a small thickness and improved portability if gaps between lens groups are small after the lens barrel is retracted. According to various embodiments, highly refractive lens materials and aspheric lens surfaces are used to minimize lens thicknesses and the length between a wide-angle position and a telephoto position, and thus to provide small zoom lenses. According to various embodiments, the zoom lens may have a zoom magnification equal to or greater than 16 times. In addition, the zoom lens may include at least one plastic lens for cost reduction.

Figure 7:
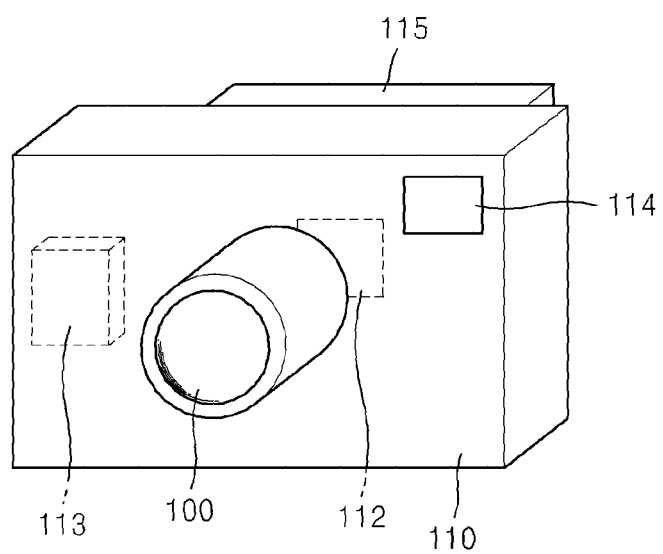
FIG. 7 is a view illustrating an electronic apparatus according to an embodiment.

FIG. 7 is a view illustrating an electronic apparatus which, in this embodiment, is a photographing apparatus 110. The photographing apparatus 110 includes a zoom lens 100, and an image sensor 112 that converts optical images formed by the zoom lens 100 into electrical image signals. The zoom lens 100 may be implemented as any of the embodiments described in conjunction with FIGS. 1 to 6B. The photographing apparatus 110 may include a recording medium 113 and a viewfinder 114. Information about objects may be photoelectrically converted by the image sensor 112 and recorded in the recording medium 113. The viewfinder 114 may be used to view an object to be photographed. The photographing apparatus 110 may include a display unit 115 to display object images. In the current embodiment, both the viewfinder 114 and the display unit 115 are provided. In other embodiments, however, only the display unit 115 may be provided. The photographing apparatus 110 illustrated in FIG. 7 is only a non-limiting example to which the zoom lens of the various embodiments may be applied. In other examples, the zoom lens may be used in other apparatuses such as cameras, mobile optical apparatuses, and smartphone cameras. If the zoom lens of the various embodiments is used in photographing apparatuses such as digital cameras and cameras of mobile devices, the photographing apparatuses may have small sizes and high photographing performance.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments. In the description of the embodiments, certain detailed explanations of related art are omitted when it is deemed that they may unnecessarily obscure the essence of the disclosure.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description but by the following claims, and all differences within the scope will be construed as being included in the disclosure. No item or component is essential to the practice of the embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens comprising:
a first lens group having a positive refractive power;
a second lens group having a negative refractive power;
a third lens group having a positive refractive power;
a fourth lens group having a negative refractive power; and
a fifth lens group having a positive refractive power;
wherein:
the first to fifth lens groups are sequentially arranged in a direction from an object side,
during zooming from a wide-angle position to a telephoto position, the first to fifth lens groups are moved,
the second lens group comprises an aspheric lens that is the closest to the image side of the second lens group,
the third lens group comprises a first lens having a positive refractive power, a second lens having a negative refractive power, and a third lens having a positive refractive power, wherein the first lens, the second lens, and the third lens are sequentially arranged in a direction from an object side,
the second lens of the third lens group comprises a concave object-side surface,
the fourth lens group comprises a lens having a negative refractive power and having a convex object-side surface, and
the fifth lens group comprises a lens having a positive refraction power and having a convex object-side surface,
wherein the zoom lens satisfies the following expression:

$$70 < G3vd < 96$$

wherein G3vd denotes an Abbe number of a positive lens of the third lens group closest to the image side.

2. The zoom lens of claim 1, wherein the second lens group comprises one or more lenses, and:

$$2.0 < nG6 < 2.5$$

where nG6 denotes a refractive index of the lens of the second lens group closest to the image side.

3. The zoom lens of claim 1, wherein:

$$16 \leq ft/fw \leq 20$$

where ft denotes a focal length of the zoom lens at the telephoto position, and fw denotes a focal length of the zoom lens at the wide-angle position.

4. The zoom lens of claim 1, wherein the second lens of the third lens group is a double concave lens.

5. The zoom lens of claim 1, wherein the second lens group comprises, sequentially from the object side to the image side, a negative lens, a negative lens, and a positive lens.

6. The zoom lens of claim 5, wherein:

$$1.0 \leq G6R1/G6f \leq 2.0$$

where G6R1 denotes a radius of curvature of an object-side surface of the positive lens of the second lens group, and G6f denotes a focal length of the positive lens of the second lens group.

7. The zoom lens of claim 1, wherein the first lens is an aspheric bi-convex lens.

8. The zoom lens of claim 1, wherein:

$$1 \leq L3G/L2G \leq 2.1$$

where L3G denotes a distance that the third lens group moves during zooming, and L2G denotes a distance that the second lens group moves during zooming.

9. The zoom lens of claim 1, wherein:

$$50 \leq 4Gvd \leq 82$$

where 4Gvd denotes an Abbe number of the lens of the fourth lens group.

10. The zoom lens of claim 1, wherein the lens of the fifth lens group has a refractive index equal to or lower than about 1.55.

11. The zoom lens of claim 10, wherein the lens of the fifth lens group is an aspheric plastic lens.

12. The zoom lens of claim 1, wherein during zooming, a distance between the first and second lens groups is increased, a distance between the second and third lens groups is decreased, a distance between the third and fourth lens groups is increased, and a distance between the fourth and fifth lens groups is decreased.

13. The zoom lens of claim 1, wherein the fifth lens group is used for focusing.

14. The zoom lens of claim 1, wherein the lens of the fourth lens group and the lens of the fifth lens group have meniscus shapes.

15. A photographing apparatus comprising:
a zoom lens; and
an imaging device configured to receive images formed by the zoom lens, wherein:
the zoom lens comprises a first lens group having a positive refractive power, a second lens group having a negative refractive power, a third lens group having a positive refractive power, a fourth lens group having a negative refractive power, and a fifth lens group having a positive refractive power,
the first to fifth lens groups are sequentially arranged in a direction from an object side,
during zooming from a wide-angle position to a telephoto position, the first to fifth lens groups are moved,
the second lens group comprises an aspheric lens that is the closest to the image side of the second lens group,
the third lens group comprises a first lens having a positive refractive power, a second lens having a negative refractive power, and a third lens having a positive refractive power, wherein the first lens, the second lens, and the third lens are sequentially arranged in a direction from an object side,
the second lens of the third lens group comprises a concave object-side surface,
the fourth lens group comprises a lens having a negative refractive power and having a convex object-side surface, and
the fifth lens group comprises a lens having a positive refractive power and having a convex object-side surface,
wherein the zoom lens satisfies the following expression:

$$70 < G3vd < 96$$

where G3vd denotes an Abbe number of a positive lens of the third lens group closest to the image side.

* * * * *